July 4, 1944.  J. D. LANGDON  2,352,642
CHECK VALVE DEVICE
Filed Jan. 28, 1942

Jesse D. Langdon
INVENTOR.

BY Henry J. Lucke
Attorney

Patented July 4, 1944

2,352,642

UNITED STATES PATENT OFFICE 2,352,642

CHECK VALVE DEVICE

Jesse D. Langdon, Downey, Calif.

Application January 28, 1942, Serial No. 428,600

8 Claims. (Cl. 137—69)

This application is a continuation in part of Ser. No. 410,139, dated September 9, 1941, for Siphon breaker and valve.

This invention relates to check valves for attachment to fluid pipe supply lines and the like with the primary purpose in view of preventing backflow thru a fluid supply line when a vacuum occurs within the supply line.

Another object is to form a flexible tube which becomes a check valve within itself due to the inherent structure of same.

A still further object is to form a tubular check valve that is normally closed thruout its length and is subject to being expanded to increased capacity and passage area with a minimum of fluid pressure.

The accompanying drawing is for the purpose of illustration only and it is specifically understood that the structure shown illustrates only two forms of reduction to practice which may be changed within the scope of the claims.

Of the drawing—

Figure 1:
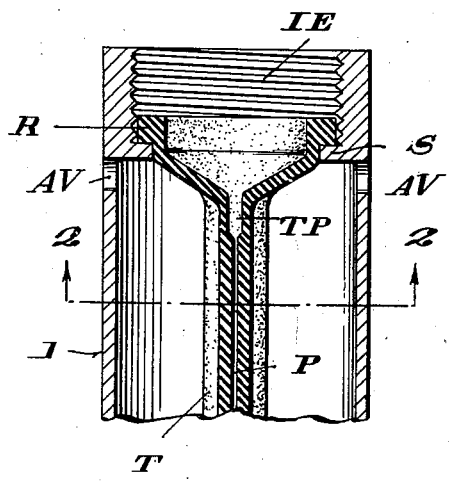
Fig. 1 is a longitudinal section of a tubular coupler casing I having a flat tube T made of flexible material terminating in a rim R extending therefrom and resting upon a shoulder S extended radially inward of tubular coupler I provided with air vents AV.
Figure 3:
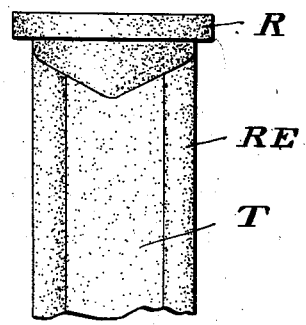
Fig. 3 is a view of the substantially flat side of flat tube T.
Figure 2:
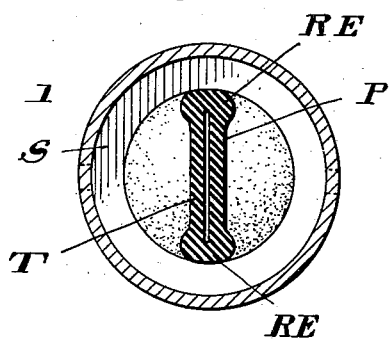
Fig. 2 is a transverse section as at 2—2 Fig. 1 looking up.

In Fig. 1 the circular rim R of tube T rests upon a shoulder S extending radially inward of tubular coupler I having air vents AV perforated thru the wall thereof. The tube T is made of some suitable flexible material such as rubber or cloth and has a thinner wall section TP for the passageway P starting at a point just below where tube T begins to flare to form the circular rim R resting on shoulder S of the coupler I.

The slit like passage P of tube T has two opposing wall surfaces which lie parallel to one another normally nearly closing or completely closing the passageway P. A reinforced or thickened edge RE is provided at each end of passage P and serves to aid in holding the opposing sides of passage P together at all times except when fluid is flowing thru the passage P.

To place the flexible check valve in operation, tubular coupling I is attached to a source of fluid supply. Rim R being impinged against the end of any supply line to which the device is attached by internally threaded inlet end IE thus making a sealed coupling.

Water flowing thru tube T causes same to expand and permit the flow of fluid thru passage P which enlarges commensurate with the amount of fluid flowing into tube T.

When a vacuum is applied to inlet end IE the passage P in tube T is held tightly together by atmospheric pressure which is allowed to freely enter tubular coupling I through air vents AV when the ends of the tube T and casing I are immersed in liquid.

The thinner wall portion TP of tube T is designed and made weaker than the rest of the tube T so that the wall TP will give way or break first from wear or tension, therefore should a hole develop at TP of flexible tube T at a point below shoulder S when the end of casing I is immersed in liquid, the air vents AV will permit atmospheric pressure to enter tubular coupling I and break any vacuum exerted within the tube I.

The tube T may be extended to any length desired and if immersed in fluid will not permit the backflow of liquid from a container when subatmospheric pressure exists in the supply line to which the device is attached, thus affording valuable protection against contamination of a supply line by backflow or syphonage of impure liquid.

Figure 4:
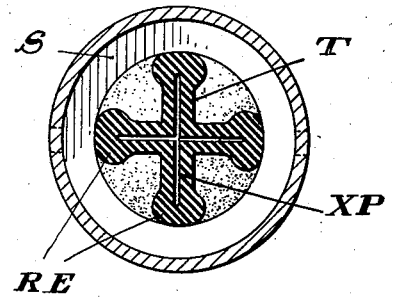
Fig. 4 is a transverse section of another form of tube having a ramified passage XP.

In the modification shown by Fig. 4 the tube T is made with an X shaped passage XP and it is obvious that the greater number of ramified flutes forming the passageway XP the greater will be the capacity of the tube T and less pressure will be required to expand and open passages XP if the wall thickness is the same for both forms as shown in Figs. 1 and 4.

Having described the invention and the operation thereof the following claims are made.

I claim:

1. A tubular check valve device including an elongated one-piece tube of flexible material formed with a slit-like passageway extending therethru together with reinforcing means integral with the structure of said tube and straddling the ends of the slit and so constructed and arranged that the opposing walls forming the sides of said slit-like passageway are urged toward one another at all times.

2. A check valve device comprising tubular coupling means having air vents in a side wall thereof, said coupling means having attached therein a flattened flexible tubular structure made of material capable of being deformed and returning to normal shape after being deformed, the wall of the flexible tube adjacent the air vents in the coupling means being substantially thinner proximal to the point of connection with said tubular coupling means than at any other location along the flexible tube, whereby wear or undue tension will tend to cause separation to take place at the thin wall portion prior to fracture or separation anywhere else in the length of the flexible tubular structure.

3. A one-piece flexible tubular check valve device formed with a slit-like passage therethru having opposed side walls merging into integral thickened end walls so constructed and arranged that the side walls of the tube are urged together, the material of said tubular check valve device and the thickened end walls being expansible and capable of returning to normal shape after being expanded.

4. A check valve device comprising coupler attaching means having interiorly thereof a one-piece substantially flat, tubular check valve made of flexible material having opposed parallel side walls in relatively close face-to-face adjacency and thickened end walls integral with said side walls constructed and arranged to urge the side walls toward each other, whereby to define an elongated slit-like passageway through said check valve, said integral thickened end walls straddling the termini of said slit-like passageway to resiliently reinforce the same.

5. A check valve comprising, in combination, a tubular casing, means for attaching said tubular casing to a water line, a plurality of air ports through the wall of said casing immediately beneath said attaching means, and check valve means supported within said tubular casing, said check valve means comprising an elongated tube of flexible material having relatively flat side walls defining a slit-like passageway, the wall of the tube being thickened for substantially its entire length over an area commencing at a point on one side wall forwardly of the terminus of the slit and extending as a thick wall completely around the edge of the tube to the other side wall opposite the point of beginning of the first side wall, said thickened portion being constructed and arranged to maintain the wall surfaces of the tube normally in close relationship to each other.

6. Check valve means comprising an elongated tube of flexible material fluted along its longitudinal axis to provide a plurality of relatively flat tube elements defining slit-like passages radiating from a common center, each of the respective tube elements being thickened for substantially its entire length over an area commencing at a point on a side wall forwardly of the terminus of the slit therein and extending as a thick wall around the terminus of the slit to the corresponding location on the opposite side wall of the tube element, thereby to reinforce the tube element at the side margin thereof and said thickened portions being constructed and arranged to maintain the adjacent wall surfaces of said tube element normally in close relationship with each other.

7. Check valve means comprising an elongated tube of flexible material having relatively flat side walls defining a slit-like passageway, the wall of the tube being thickened for substantially its entire length over an area commencing at a point on one side wall forwardly of the terminus of the slit and extending as a thick wall completely around the edge of the tube to the other side wall opposite the point of beginning at the first side wall, said thickened portion being constructed and arranged to maintain the wall surfaces normally in close relationship to each other.

8. Check valve means comprising an elongated tube of flexible material having relatively flat side walls defining a slit-like passageway, a wall of the tube being thickened for substantially its entire length over an area commencing at a point on said wall forwardly of the terminus of the slit and extending as a thick wall about the edge of the tube, said thickened portion being constructed and arranged to maintain the side wall surfaces of the tubes normally in close relationship to each other.

JESSE D. LANGDON.